US011879310B2

United States Patent
Song et al.

(10) Patent No.: US 11,879,310 B2
(45) Date of Patent: Jan. 23, 2024

(54) EFFICIENT GAS HYDRATE PRODUCTION SYSTEM USING FLUE GAS WASTE HEAT / SOLAR ABSORPTION HEAT PUMP TO COMPENSATE RESERVOIR HEAT

(71) Applicant: DALIAN UNIVERSITY OF TECHNOLOGY, Liaoning (CN)

(72) Inventors: Yongchen Song, Liaoning (CN); Mingjun Yang, Liaoning (CN); Xinru Wang, Liaoning (CN); Jianan Zheng, Liaoning (CN); Jiafei Zhao, Liaoning (CN); Lanlan Jiang, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 397 days.

(21) Appl. No.: 17/415,986

(22) PCT Filed: Aug. 27, 2020

(86) PCT No.: PCT/CN2020/111716
§ 371 (c)(1),
(2) Date: Jun. 18, 2021

(87) PCT Pub. No.: WO2022/011796
PCT Pub. Date: Jan. 20, 2022

(65) Prior Publication Data
US 2022/0145731 A1 May 12, 2022

(30) Foreign Application Priority Data

Jul. 17, 2020 (CN) .......................... 202010694018.1
Jul. 17, 2020 (CN) .......................... 202010694032.1
Jul. 17, 2020 (CN) .......................... 202010694604.6

(51) Int. Cl.
*F24S 20/40* (2018.01)
*E21B 43/24* (2006.01)
(Continued)

(52) U.S. Cl.
CPC .............. *E21B 43/01* (2013.01); *E21B 43/24* (2013.01); *E21B 43/295* (2013.01); *E21B 43/30* (2013.01);
(Continued)

(58) Field of Classification Search
CPC ........ F25B 30/04; F25B 15/00; F25B 27/007; F01K 17/00; Y02E 10/40; F24S 90/00; F24S 20/40; E21B 43/24
See application file for complete search history.

(56) References Cited

U.S. PATENT DOCUMENTS

| 4,110,628 A | 8/1978 | Paull et al. |
| 2018/0094548 A1* | 4/2018 | Jeter ....................... F01K 19/00 |

FOREIGN PATENT DOCUMENTS

| CN | 1690360 A | 11/2005 |
| CN | 105840159 A | 8/2016 |

(Continued)

*Primary Examiner* — Ana M Vazquez
(74) *Attorney, Agent, or Firm* — Muncy, Geissler, Olds & Lowe, P.C.

(57) ABSTRACT

An efficient gas hydrate production system using flue gas waste heat/solar absorption heat pump to compensate reservoir heat, includes a heat source absorption system, heat pump heating system and reservoir heat compensation system. The invention uses the low-grade heat energy of offshore platform to solve the problems of heat source and energy consumption in the process of natural gas hydrate exploitation. It provides a commercial feasible scheme for large-scale exploitation of natural gas hydrate. The condenser module, evaporator module and injection well module of the invention can be flexibly increased or decreased, and can adapt to a variety of actual hydrate reservoir distribution; the injection well module adopts ball-nozzle, which can disperse and evenly inject the hot injected water into the reservoir, which is convenient for the rapid and
(Continued)

effective transfer of reservoir heat and improves the speed of reservoir heat compensation.

3 Claims, 3 Drawing Sheets

(51) Int. Cl.
*E21B 43/30* (2006.01)
*E21B 43/34* (2006.01)
*F25B 30/02* (2006.01)
*E21B 43/01* (2006.01)
*E21B 43/295* (2006.01)
*F25B 27/02* (2006.01)

(52) U.S. Cl.
CPC .............. *E21B 43/34* (2013.01); *F24S 20/40* (2018.05); *F25B 27/02* (2013.01); *F25B 30/02* (2013.01)

(56) References Cited

FOREIGN PATENT DOCUMENTS

| | | | |
|---|---|---|---|
| CN | 106593372 | A | 4/2017 |
| CN | 108005618 | A | 5/2018 |
| CN | 108387013 | A | 8/2018 |

\* cited by examiner

EFFICIENT GAS HYDRATE PRODUCTION SYSTEM USING FLUE GAS WASTE HEAT / SOLAR ABSORPTION HEAT PUMP TO COMPENSATE RESERVOIR HEAT

TECHNICAL FIELD

The present invention belongs to the technical field of marine oil and gas resources development. Aiming at the efficiency problem in the exploitation of marine natural gas hydrate, the absorption heat pump technology is used to improve the grade of flue gas waste heat of offshore generator and offshore solar energy, so as to provide heat compensation for the exploitation of marine natural gas hydrate. The invention relates to an efficient gas hydrate production system using flue gas waste heat/solar absorption heat pump to compensate reservoir heat.

BACKGROUND

Natural gas hydrate, commonly known as combustible ice, is an important clean energy. In the process of natural gas hydrate exploitation, natural gas hydrate decomposes, which is an endothermic reaction. The decomposed natural gas also carries part of the heat when it is produced. Therefore, the temperature of reservoir will decrease in the process of natural gas hydrate decomposition. In addition, the decomposition of natural gas hydrate is affected by reservoir temperature and pressure. Under the same pressure, the higher the temperature is, the greater the decomposition driving force is, and the faster the decomposition is. Therefore, in order to realize the continuous and rapid decomposition of hydrate and efficient gas production, it is necessary to ensure the temperature of the reservoir, that is, to compensate the heat of the reservoir. At present, there is no effective reservoir heat compensation scheme in the process of marine gas hydrate exploitation.

In the marine environment, a large amount of waste heat can be recycled from the exhaust gas of steam turbine on the offshore platform. At the same time, solar energy is rich in marine environment, but the grade of which is not high, and is affected by the weather and unstable. Absorption heat pump is a kind of equipment which can transfer heat from low temperature to high temperature with thermal energy as compensation. It can save energy and protect the environment. It can raise the temperature of flue gas waste heat of gas turbine generator in offshore oil field and solar energy for hydrate exploitation.

SUMMARY

Based on the above background, the present invention takes the flue gas waste heat of offshore oil field gas turbine generator and the abundant solar energy on the sea as the low-temperature heat source of absorption heat pump to release high-grade heat and combines the marine natural gas hydrate exploitation technology. The present invention provides the efficient gas hydrate production system using flue gas waste heat/solar absorption heat pump to compensate reservoir heat.

The technical solution of the present invention:

The efficient gas hydrate production system using flue gas waste heat/solar absorption heat pump to compensate reservoir heat. includes a heat source absorption system 1, heat pump heating system 2 and reservoir heat compensation system 3;

The heat source absorption system 1 is mainly composed of a flue gas heat exchange part and a solar energy heat collecting part;

The flue gas heat exchange part includes a flue gas heat exchanger 4 and a first flow regulating valve 5, and the circulating water heated by the hot flue gas in the flue gas heat exchanger 4 flows through the first flow regulating valve 5 to the heat pump heating system 2; The first flow regulating valve 5 is used to regulate the temperature of circulating water of the flue gas heat exchange part entering the heat pump heating system 2;

The solar heat collecting part comprises a second flow control valve 7 and a solar collector 6, the solar heat collector 6 is used for heating the low-temperature circulating water, and the heated circulating water flows into the heat pump heating system 2 through the second flow control valve 7; The second flow control valve 7 is used to regulate the temperature of the circulating water entering the heat pump heating system 2 in the solar heat collecting part;

The heat pump heating system 2 is mainly composed of a generator module, condenser module, absorber module and evaporator module;

The generator module comprises a condensing tube 9, a concentrated solution tube 10 and a solution circulating pump 11. The condensing tube 9 realizes the communication between the generator 8 and the condenser module. The sprayer of the generator 8 is connected with the absorber module through the solution circulating pump 11. The concentrated solution tube 10 realizes the communication between the generator 8 and the absorber module. The inlet of the primary heat release tube in the generator 8 is connected with the heat source absorption system 1, and the outlet is connected with the evaporator module;

The absorber module comprises an absorber 12, concentrated solution pipe 10, evaporation tube 13, dilute solution pipe 17, solution circulating pump 11 and a water pump 36. The evaporation pipe 13 realizes the communication between the absorber 12 and the evaporator module. The dilute solution pipe 17 connects the lower part of the absorber 12 and the solution circulating pump 11. The concentrated solution pipe 10 connects the sprayer of the absorber 12. The inlet of the primary heating pipe in the absorber 12 connects the water pump 36, and the outlet is connected with the condenser module;

The condenser module comprises a condenser 14, a condensing tube 9, a condensate pipe 15, a U-connector 16 and a hot water storage tank 21. The condensing tube 9 realizes the communication between the condenser 14 and the generator module, and the condensate pipe 15 connects the condenser 14 and the U-connector 16. The inlet of the secondary heating pipe in the condenser 14 is connected with the absorber module, and the outlet is connected with the hot water storage tank 21.

The evaporator module includes an evaporator 18, U-connector 16, condensate water pump 20, evaporation pipe 13 and circulating water pump 19. The condensate spray device in the inner upper part of the evaporator 18 is connected with u-connector 16. The inlet of secondary heat discharge pipe in evaporator 18 is connected with the absorber module, and the outlet of evaporator 18 is connected with the circulating water pump 19. The condensate water pump 20 is below evaporator 18, and connects the bottom outlet of the evaporator 18 with the condensate water sprayer in the evaporator 18;

The reservoir heat compensation system 3 is mainly composed of an injection well module and production well module;

The injection well module comprises a hot water storage tank 21, injection pump 22, injection well 27, ball-nozzle 23, temperature controller 24, thermocouple 25 and auxiliary heater 26. One end of the injection pump 22 is connected with the hot water storage tank 21, and the other end is connected with the injection well 27; The end of the injection well 27 is connected with the ball-nozzle 23, and the temperature of the hot water storage tank 21 is controlled by the temperature controller 24 according to the signal of the thermocouple 25 on the inner wall of the hot water storage tank 21, which is realized by controlling a switch of the auxiliary heater 26 on the periphery of the hot water storage tank 21;

The production well module comprises a production well 28, seawater storage tank 29, gas-liquid separator 30, gas collecting cylinder 31, a suction pump 32, horizontal well 33, multi-cluster production hole 35, water pump 36, ball valve 34 and water outlet pipe 37. The lower part of the production well 28 is connected with the horizontal well 33 with the multi cluster production hole 35, and the upper part of the production well 28 is connected with a gas-liquid separator 30. The top part of the gas-liquid separator 30 is connected with the gas collecting cylinder 31 and the lower part of the gas-liquid separator 30 is connected with the outlet pipe 37. The lower part of the seawater storage tank 29 is connected with the suction pump 32, and the middle part of the seawater storage tank 29 is connected with the water pump 36. The seawater level of the seawater storage tank 29 is controlled by the suction pump 32 at the lower part of the seawater storage tank 29 controlled by the ball valve 34 inside the seawater storage tank 29;

The operation of the system includes a circulating water flow, solution circulating flow and injection water flow;

The circulating water absorbs heat in the flue gas heat exchanger 4 and the solar collector 6 and converges, enters the first stage heat release tube in the generator 8 to exchange heat with the dilute solution outside the tube, enters the second stage heat release tube in the evaporator 18 to exchange heat with the condensate outside the tube, returns to the heat source absorption system 1 through the circulating water pump 19, and then flows into the heat exchange tube 7 and the solar collector 6 respectively;

The solution circulates in the absorber module, the generator module, the condenser module and the evaporator module. The dilute solution exchanges heat with the circulating water in the first stage heat release tube in the generator 8. The water in the solution turns into steam, the remaining solution turns into concentrated solution and enters the absorber 12. The steam enters the condenser 14 and exchanges heat with the injected water in the second stage heating tube and turns into condensed water. The condensed water enters the U-connector 16 to depressurize, and then enters the evaporator 18 to exchange heat with the circulating water in the second stage heat release tube. The evaporated steam enters the absorber 12 to mix with the concentrated solution to form a dilute solution, and at the same time exchanges heat with the injected water of the first stage heating tube in the absorber 12;

The injected water flows in the seawater storage tank 29, the absorber 12, the condenser 14 and the injection well 27. The injected water in the seawater storage tank 29 enters the primary heating pipe in the absorber 12 through the water pump 36 to exchange heat with the concentrated solution outside the pipe, and then enters the secondary heating pipe in the condenser 14 to exchange heat with the water vapor outside the pipe, and then enters the hot water storage tank 21 for heat preservation. The hot water in the hot water storage tank 21 enters the injection well 27 through the injection pump 22, is evenly distributed at 23 of the ball nozzle to compensate the heat required for hydrate decomposition. The injected water and the natural gas and water from hydrate decomposition flows from the multi cluster production hole 35 through the horizontal well 33 to the production well 28, and then into the gas-liquid separator 30. The produced water is discharged from the outlet pipe 38 to the sea water layer, and the produced natural gas enters the gas collecting cylinder 31 from the top;

The condenser module and evaporator module are used in pairs together with the injection well module.

The ball-nozzle 23 is spherical and porous, which disperses and evenly injects the heat injected water into the reservoir, facilitates the rapid and effective heat transfer of the reservoir, and improves the heat compensation speed of the reservoir.

Beneficial effects of the invention are as follows: It proposes the efficient gas hydrate production system using flue gas waste heat/solar absorption heat pump to compensate reservoir heat, which combines absorption heat pump technology with marine natural gas hydrate exploitation technology, and solves the problems of heat source and energy consumption in the process of natural gas hydrate exploitation by using the low-grade heat energy of offshore platform. It provides a commercial feasible scheme for large-scale exploitation of natural gas hydrate.

DESCRIPTION OF THE DRAWINGS

In the figure: 1 is a heat source absorption system; 2 is a heat pump heating system; 3 is a reservoir heat compensation system; 4 is a flue gas heat exchanger; 5 is a first flow control valve; 6 is a solar collector; 7 is a second flow control valve; 8 is a generator; 9 is a condensing tube; 10 is a concentrated solution tube; 11 is a solution circulating pump; 12 is an absorber; 13 is an evaporation tube; 14 is a condenser; 15 is a condensate pipe; 16 is a U-connector; 17 is a dilute solution tube; 18 is an evaporator; 19 is a circulating water pump; 20 is a condensate water pump; 21 is a hot water storage tank; 22 is an injection pump; 23 is a ball-nozzle; 24 is a temperature controller; 25 is a thermocouple; 26 is an auxiliary heater; 27 is an injection well; 28 is a production well; 29 is a seawater storage tank; 30 is a gas-liquid separator; 31 is a gas collecting cylinder; 32 is a suction pump; 33 is a horizontal well; 34 is a ball valve; 35 is a multi-cluster mining hole; 36 is a water pump; 37 is an outlet pipe.

DETAILED DESCRIPTION

Following is the detailed description of the specific embodiment of the present invention combining the technical solution and accompanying drawings.

The efficient gas hydrate production system using flue gas waste heat/solar absorption heat pump to compensate reservoir heat includes a heat source absorption system 1, heat pump heating system 2 and reservoir heat compensation system 3.

The heat source absorption system 1 is composed of flue gas heat exchange part and solar collector part;

The flue gas heat exchange part includes the flue gas heat exchanger 4 and the first flow control valve 5. The heat exchange pipe is placed in the flue gas heat exchanger 4. The hot flue gas entering the flue gas heat exchanger 4 from the flue gas inlet exchanges heat with the low-temperature circulating water in the heat exchange pipe. The low-temperature flue gas after heat exchange is discharged from the flue gas outlet. The circulating water heated by the hot flue gas flows into the heat pump heating system 2 through the first flow control valve 5.

The solar collector part comprises the second flow control valve 7 and a solar collector 6. The solar collector 6 is used to heat the low-temperature circulating water, and the heated circulating water flows into the heat pump heating system 2 through the second flow control valve 7;

The first flow regulating valve 5 and the second flow regulating valve 7 regulate the temperature of the circulating water of the flue gas heat exchange part and the solar collector part entering the heat pump heating system 2 respectively.

The heat pump heating system 2 consists of a generator module, condenser module, absorber module and evaporator module;

The generator module consists of the condensing tube 9, concentrated solution tube 10 and solution circulating pump 11. The dilute solution sprayer and a primary heat release tube are arranged inside the generator. The condenser tube 9 connects the upper part of the generator to the condenser module. The dilute solution sprayer is placed in the upper part of the generator and connected with the absorber module through the solution circulating pump 11. The concentrated solution pipe 10 connects the lower part of the generator with the absorber module. The first stage heat release pipe is located under the dilute solution sprayer. The thermal circulating water from the heat source absorption system 1 flows into the upper part of the first stage heat release pipe, and exchanges heat with the dilute solution uniformly ejected from the dilute solution sprayer in the generator. The water vapor from the heated dilute solution flows upward through the condensing tube 9 and enters the condenser module. The evaporated dilute solution turns into a concentrated solution, flows downward and enters the absorber module through the concentrated solution tube 10, and the circulating water after heat exchange flows out from the lower part of the primary heat release tube into the evaporator module;

The absorber module comprises an absorber 12, a concentrated solution pipe 10, an evaporation pipe 13, a dilute solution pipe 17, a solution circulating pump 11 and a water delivery pump 36. The concentrated solution sprayer and the primary heating pipe are respectively arranged inside the absorber 12. The evaporation pipe 13 connects the upper part of the absorber 12 with the evaporator module. The concentrated solution sprayer is above the primary heating pipe, and the dilute solution pipe 17 is below the absorber, the concentrated solution flows into the concentrated solution sprayer through the concentrated solution pipe 10 and is evenly ejected. It absorbs the water vapor flowing into the evaporator module through the evaporation pipe 13 and turns into a dilute solution. It exchanges heat with the injected water from the reservoir heat compensation system 3 in the primary heating pipe. The dilute solution after heat exchange is connected with the solution circulating pump 11 connected to the generator module through the dilute solution pipe 17, The injected water after heat exchange flows out from the primary heating tube and enters the condenser module;

The condenser module consists of the condenser 14, condenser tube 9, condenser water tube 15, U-shaped connector 16 and hot water storage tank 21. The secondary heating tube is located in the middle of the condenser 14. The condensing tube 9 connects the upper part of the condenser 14 with the generator module, and the condensate pipe 15 connects the lower part of the condenser 14 with the U-shaped connector 16. After heat exchange, the injected water flows into the hot water storage tank 21, and the condensed water formed after heat exchange flows from the lower part of the condenser 14 into the condensate pipe 15, and then into the U-connector 16 connected with the evaporator module;

The evaporator module includes the evaporator 18, U-shaped connector 16, condensate water pump 20, evaporation pipe 13 and circulating water pump 19. The condensate water sprayer is connected with the U-shaped connector 16 in the upper part of the evaporator 18. The secondary heat release pipe is in the lower part of the evaporator 18, the outlet is connected with the circulating water pump 19 outside the evaporator 18, and the condensate water pump 20 below the evaporator 18, connect the bottom of the evaporator 18 with the condensate water sprayer. The condensate from the U-connector 16 flowing into the condensate sprinkler is evenly sprayed above the second stage heat release pipe to exchange heat with the circulating water in the second stage heat release pipe. The circulating water after heat exchange enters the heat source absorption system 1 through the circulating water pump 19. A part of the condensed water after heat exchange becomes steam and enters the evaporation tube 13, and a part is sent back to the condensate sprinkler by the condensate pump 20 at the bottom of the evaporator 18 in the form of liquid;

Condenser module and evaporator module are used in pairs with injection well module.

Reservoir heat compensation system 3 is mainly composed of injection well module and production well module;

The injection well module includes the hot water storage tank 21, injection pump 22, injection well 27, ball-nozzle 23, temperature controller 24, thermocouple 25 and auxiliary heater 26. The outlet of the secondary heating pipe is connected with the hot water storage tank 21, one end of the injection pump 22 is connected with the hot water storage tank 21, one end is connected with the injection well 27, and the end of the injection well 27 is connected with the ball-nozzle 23. The hot water storage tank 21 is used to store the hot injected water from the condenser module. The temperature of the hot water storage tank 21 is controlled by the temperature controller 24 according to the signal of the thermocouple 25 on the inner wall of the hot water storage tank 21. Specifically, it is realized by controlling the opening and closing of the auxiliary heater 26 on the periphery of the hot water storage tank 21. The hot injected water stored in the hot water storage tank 21 is injected into the hydrate reservoir by the injection pump 22 through the ball-nozzle 23 at the bottom of the injection well 27. The injection pump 22 controls the injected water flow according to the decomposition of hydrate in the production well module to maintain the reservoir temperature required for the rapid decomposition of hydrate. The ball-nozzle 23 is spherical and porous, which can disperse and evenly inject the hot injected water into the reservoir, which is convenient for the rapid and effective transfer of reservoir heat and improves the speed of reservoir heat compensation;

The exploitation well module includes the production well 28, seawater storage tank 29, gas-liquid separator 30, gas collecting cylinder 31, suction pump 32, horizontal well 33, multi cluster exploitation hole 35, water pump 36, ball valve 34 and outlet pipe 37. The lower part of exploitation well 28 is connected with horizontal well 33 with multi-cluster mining hole 35, and the upper part of production well 28 is connected with gas-liquid separator 30. The top part of gas-liquid separator 30 is connected with gas collecting cylinder 31 and the lower part of gas-liquid separator 30 is connected with the outlet pipe 37. The lower part of the seawater storage tank 29 is connected with the suction pump 32, and the middle part is connected with the inlet of the primary heating pipe by the water pump. The injected water and the natural gas and water produced by the decomposition of hydrate flow from the multi cluster exploitation hole 35 through the horizontal well 33, into the production well 28, and then into the gas-liquid separator 30. Under the action of the separation plate, the produced water is discharged from the outlet pipe 37 to the seawater layer, and the produced natural gas enters the gas collecting cylinder 31 from the top. The seawater level of the seawater storage tank 29 is controlled by the suction pump 32 at the lower part of the seawater storage tank 29 controlled by the ball valve 34 inside the seawater storage tank 29. The seawater storage tank 29 is connected with the absorber module through the water pump 36 to provide injection water for the absorber module.

Figure 1:
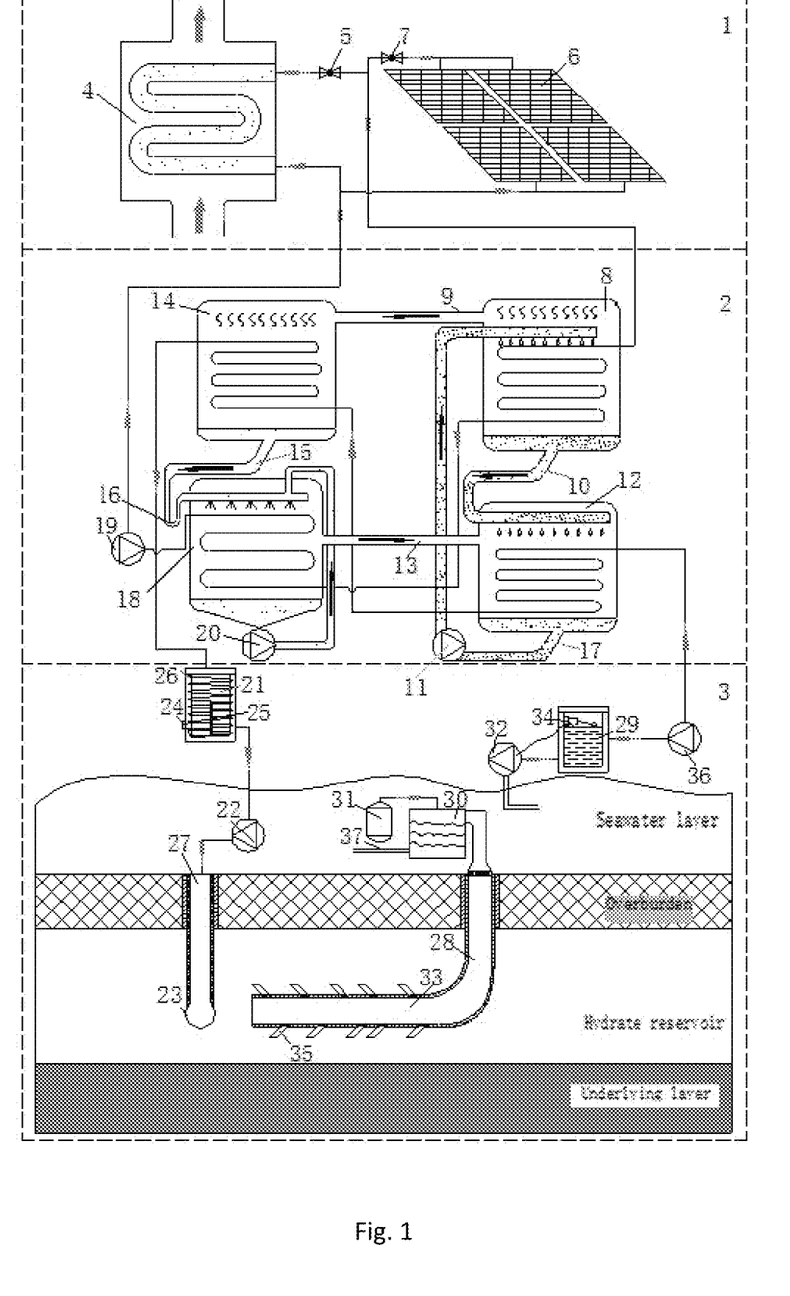
FIG. 1 is a schematic diagram of the efficient gas hydrate production system using flue gas waste heat/solar absorption heat pump to compensate reservoir heat.
Figure 2:
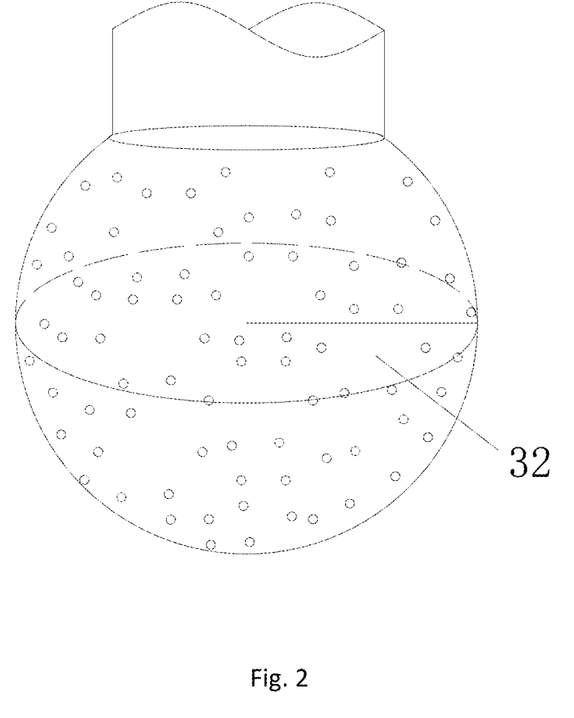
FIG. 2 is a schematic diagram of the suction pump in the efficient gas hydrate production system using flue gas waste heat/solar absorption heat pump to compensate reservoir heat.

In example 1, the specific work flow of the system for efficient exploitation of natural gas hydrate using flue gas waste heat absorption heat pump to compensate reservoir heat is shown in FIG. 1

The waste heat of flue gas is absorbed by circulating water at the periphery of the heat exchange tube, and the temperature of the thermal circulating water output by the heat absorption system 1 is controlled by adjusting the flow of the outflow water through the first flow regulating valve 5;

The heat circulating water absorbs heat in the heat source absorption system 1 and then flows into heat pump heating system 2. It releases heat through the primary heat release tube, then releases heat in secondary heat release tube, and then returns to heat source absorption system 1 for heating.

The injected water from the seawater storage tank 29 is preheated in the absorber module, then flows into the condenser module to absorb high-grade heat, and then is kept in the hot water storage tank 21 for standby;

The injection pump 22 injects the hot water from the hot water storage tank 21 into the injection well 27, and injects it into the reservoir evenly and dispersedly at the ball-nozzle 23 to compensate the heat of the reservoir and ensure the hydrate decomposition rate;

Injected water natural gas and water from hydrate decomposition enter horizontal well 33 from multi cluster exploitation hole 35, and then enter gas-liquid separator 30. Under the action of separation plate, the produced water is discharged from the outlet pipe 37 to sea water layer, and the produced natural gas enters gas collecting cylinder 31 from the top.

In example 2, the specific work flow of the system for efficient exploitation of natural gas hydrate using solar absorption heat pump to compensate reservoir heat is shown in FIG. 1

The solar energy is absorbed by the circulating water through the solar collector 6, and the temperature of the thermal circulating water output by the heat source absorption system 1 is controlled by adjusting the flow of the outflow water through the first flow regulating valve 5;

The heat circulating water absorbs heat in the heat source absorption system 1 and then flows into heat pump heating system 2. It releases heat through the primary heat release tube, then releases heat in secondary heat release tube, and then returns to heat source absorption system 1 for heating.

The injected water from the seawater storage tank 29 is preheated in the absorber module, then flows into the condenser module to absorb high-grade heat, and then is kept in the hot water storage tank 21 for standby;

The injection pump 22 injects the hot water from the hot water storage tank 21 into the injection well 27, and injects it into the reservoir evenly and dispersedly at the ball-nozzle 23 to compensate the heat of the reservoir and ensure the hydrate decomposition rate;

Injected water natural gas and water from hydrate decomposition enter horizontal well 33 from multi cluster exploitation hole 35, and then enter gas-liquid separator 30. Under the action of separation plate, the produced water is discharged from the outlet pipe 37 to sea water layer, and the produced natural gas enters gas collecting cylinder 31 from the top.

The above two examples are only the working process of the efficient gas hydrate production system using flue gas waste heat/solar absorption heat pump to compensate reservoir heat under the mode of single production well and injection well. When the reservoir is large, in order to ensure the production efficiency, multiple injection well modules need to be used and arranged according to the spatial distribution characteristics of the hydrate reservoir. More and faster heat compensation. Example 3 shows the layout method of multi injection well mode of the efficient gas hydrate production system using flue gas waste heat/solar absorption heat pump to compensate reservoir heat.

Figure 3A:
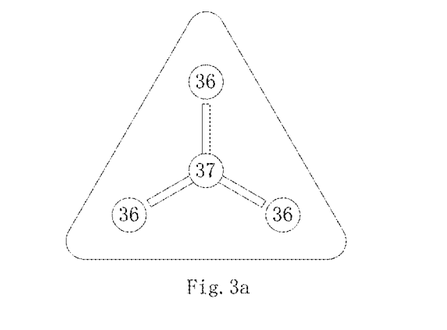
FIG. 3 is a schematic diagram of the multi injection well mode in the efficient gas hydrate production system using flue gas waste heat/solar absorption heat pump to compensate reservoir heat.
Figure 3B:
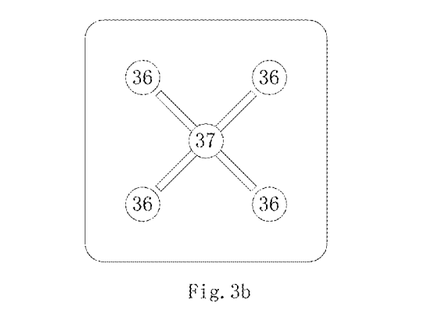
Figure 3C:
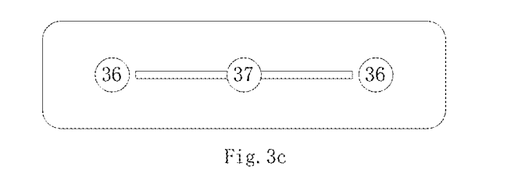

When it is detected that the distribution of hydrate reservoir is approximately rectangular, injection well modules are set near both ends of the distributable area, as shown in FIG. 3a; When the hydrate reservoir distribution is approximately triangular, three injection well modules can be arranged, as shown in FIG. 3b; When the distribution of hydrate reservoir is approximately quadrilateral, four injection well modules can be arranged, as shown in FIG. 3c.

It is worth noting that the above embodiments are examples rather than limitations of the invention. According to the basic principles and ideas of the invention, other types of heat sources, multi-stage heat pumps, multiple mining wells, injection wells, etc. can also be used for deformation, and those skilled in the art will be able to design many alternative embodiments without departing from the scope of protection of the invention.

The invention claimed is:

1. An efficient gas hydrate production system using flue gas waste heat/solar absorption heat pump to compensate reservoir heat, wherein the efficient gas hydrate production system using flue gas waste heat/solar absorption heat pump to compensate reservoir heat comprises a heat source absorption system, a heat pump heating system and a reservoir heat compensation system;

wherein the heat source absorption system is mainly composed of a flue gas heat exchange part and a solar energy heat collecting part;

the flue gas heat exchange part comprises a flue gas heat exchanger and a first flow regulating valve, and a circulating water heated by a hot flue gas in the flue gas heat exchanger flows through the first flow regulating valve to the heat pump heating system; the first flow regulating valve is used to regulate a temperature of the circulating water of the flue gas heat exchange part entering the heat pump heating system;

the solar energy heat collecting part comprises a second flow control valve and a solar collector, the solar collector is used for heating a low-temperature circulating water, and the heated circulating water flows into the heat pump heating system through the second flow control valve; the second flow control valve is used to regulate the temperature of the circulating water entering the heat pump heating system in the solar energy heat collecting part;

the heat pump heating system is mainly composed of a generator module, a condenser module, an absorber module and an evaporator module;

the generator module comprises a condensing tube, a concentrated solution tube and a solution circulating pump, the condensing tube realizes communication between a generator and the condenser module, a sprayer of the generator is connected with the absorber module through the solution circulating pump, and the concentrated solution tube realizes communication between the generator and the absorber module, an inlet of a primary heat release pipe in the generator is connected with the heat source absorption system, and an outlet is connected with the evaporator module, the absorber module comprises an absorber, the concentrated solution tube, an evaporation tube, a dilute solution pipe, a solution circulating pump and a water pump; the evaporation tube realizes communication between the absorber and the evaporator module; the dilute solution pipe connects a lower part of the absorber and the solution circulating pump; the concentrated solution pipe connects a sprayer of the absorber; an inlet of a primary heating pipe in the absorber connects the water pump, and the outlet is connected with the condenser module;

the condenser module comprises a condenser, a condensing tube, a condensate pipe, a U-connector and a hot water storage tank; the condensing tube realizes the communication between the condenser and the generator module, and the condensate pipe connects the condenser and the U-connector; an inlet of a secondary heating pipe in the condenser is connected with the absorber module, and the outlet is connected with the hot water storage tank;

the evaporator module comprises an evaporator, the U-connector, a condensate water pump, the evaporation tube and a circulating water pump; a condensate spray device in an inner upper part of the evaporator is connected with the U-connector; an inlet of secondary heat discharge pipe in the evaporator is connected with the absorber module, and an outlet of the evaporator is connected with the circulating water pump; the condensate water pump is below the evaporator, and connects the outlet of the evaporator with the condensate spray device in the evaporator;

the reservoir heat compensation system is mainly composed of an injection well module and production well module;

the injection well module comprises a hot water storage tank, an injection pump, an injection well, a ball-nozzle, a temperature controller, a thermocouple and an auxiliary heater; one end of the injection pump is connected with the hot water storage tank, and the other end is connected with the injection well; the other end of the injection well is connected with the ball-nozzle, and the temperature of the hot water storage tank is controlled by the temperature controller according to a signal of the thermocouple on an inner wall of the hot water storage tank, which is realized by controlling a switch of the auxiliary heater on a periphery of the hot water storage tank;

the production well module comprises a production well, a seawater storage tank, a gas-liquid separator, a gas collecting cylinder, a suction pump, a horizontal well, a multi-cluster production hole, the water pump, a ball valve and a water outlet pipe; a lower part of the production well is connected with the horizontal well with the multi cluster production hole, and an upper part of the production well is connected with the gas-liquid separator; a top part of the gas-liquid separator is connected with the gas collecting cylinder and a lower part of the gas-liquid separator is connected with the water outlet pipe; a lower part of the seawater storage tank is connected with the suction pump, and a middle part of the seawater storage tank is connected with the water pump; the seawater level of a seawater storage tank is controlled by the suction pump at the lower part of the seawater storage tank controlled by the ball valve inside the seawater storage tank;

an operation of the system includes a circulating water flow, solution circulating flow and injection water flow;

the circulating water absorbs heat in the flue gas heat exchanger and the solar collector and converges, enters the primary heat release pipe in the generator to exchange heat with a dilute solution outside the primary heat release pipe, enters the secondary heat discharge pipe in the evaporator to exchange heat with the condensate outside the secondary heat discharge pipe, returns to the heat source absorption system through the circulating water pump, and then flows into a heat exchange tube and the solar collector respectively;

the dilute solution circulates in the absorber module, the generator module, the condenser module and the evaporator module; the dilute solution exchanges heat with the circulating water in the first stage heat release tube in the generator; the water in the solution turns into steam, the remaining solution turns into concentrated solution and enters the absorber; the steam enters the condenser and exchanges heat with an injected water in the secondary heat discharge pipe and turns into condensed water; the condensed water enters the U-connector to depressurize, and then enters the evaporator to exchange heat with the circulating water in the secondary heat discharge pipe; the evaporated steam enters the absorber to mix with the concentrated solution to form the dilute solution, and at the same time exchanges heat with an injected water of the primary heating pipe in the absorber;

an injected water in the seawater storage tank flows in the absorber, the condenser and the injection well; the injected water in the seawater storage tank enters the primary heating pipe in the absorber through the water pump to exchange heat with the concentrated solution outside the primary heating pipe, and then enters the secondary heating pipe in the condenser to exchange heat with the water vapor outside the secondary heating pipe, and then enters the hot water storage tank for heat preservation; the hot water in the hot water storage tank enters the injection well through the injection pump, is evenly distributed at the ball nozzle to compensate the heat required for hydrate decomposition; the injected water and natural gas and water from hydrate decomposition flows from the multi cluster production hole through the horizontal well to the production well, and then into the gas-liquid separator; the produced water is discharged from the outlet pipe to a sea water layer, and the produced natural gas enters the gas collecting cylinder from a top.

2. The efficient gas hydrate production system using flue gas waste heat/solar absorption heat pump to compensate reservoir heat according to claim 1, wherein the condenser module and evaporator module are used in pairs together with the injection well module.

3. The efficient gas hydrate production system using flue gas waste heat/solar absorption heat pump to compensate reservoir heat according to claim 1, wherein the ball-nozzle is spherical and porous, which disperses and evenly injects the heat injected water into the reservoir, facilitates the rapid and effective heat transfer of the reservoir heat compensation system, and improves the heat compensation speed of the reservoir.

\* \* \* \* \*